UNITED STATES PATENT OFFICE.

GEORGE D. ROGERS, OF GLOUCESTER, MASSACHUSETTS.

METHOD OF PRESERVING FLESH.

1,249,205.　　　　Specification of Letters Patent.　　Patented Dec. 4, 1917.

No Drawing.　　Application filed September 1, 1917.　Serial No. 189,337.

*To all whom it may concern:*

Be it known that I, GEORGE D. ROGERS, a citizen of the United States, residing at Gloucester, in the county of Essex, State of Massachusetts, have invented a certain new and useful Improvement in Methods of Preserving Flesh, of which the following is a specification.

My invention relates to the treatment of flesh or other animal matter for the purpose of preserving the same in a dried form. More especially my invention has for its object to provide an improved method for preserving such flesh by causing the same to become thoroughly impregnated with salt, and to secure this result in such manner that the flesh retains more nearly its original texture and is rendered more tender and digestible than similar flesh prepared in the usual manner of sprinkling the same in salt or soaking the same in brine. Another and further object is to preserve the food elements of the same more completely than results in the ordinary salting processes.

My invention consists in preserving such flesh or animal matter through the agency of the chemical commonly called sodium hypochlorite (and represented by the chemical symbol, $NaClO$).

The practice of my invention I will describe more particularly as applied to the preservation of the flesh of fish. After cleaning and splitting the fish in usual manner the split bodies are packed in vats which are then filled with a solution of sodium hypochlorite. The bodies are allowed to remain in this solution for a period of time which varies according to the size of the fish, and the nature of the flesh; but which period should be sufficient to allow the solution thoroughly to penetrate and permeate the cellular structure of the same. The split fish bodies are then removed from the vats, and are allowed to drain and thereafter to dry in the usual manner.

If desired the split fish bodies may be sprinkled with common salt while being packed in the vats; the process of treatment thereafter being in all respects substantially as hereinabove outlined.

Without undertaking dogmatically to formulate an analysis of the operation of my process, my observations lead me to the belief that the hypochlorite solution has a capacity for permeating and entering the cellular structure or tissues of which the flesh is composed to a degree which is not possessed by saline solutions or brine, so as in consequence to become more intimately distributed throughout the flesh than does the salt dissolved in such solutions. Further it is my belief that by reason of the comparative instability of the sodium hypochlorite as a chemical compound the atom of oxygen included in the molecule of the sodium hypochlorite becomes within a relatively short time liberated therefrom; whereupon the oxygen so freed disappears, leaving behind and within said cells or tissues the remaining atoms of sodium and chlorin in the molecular combination of sodium chlorid or common salt. In this manner the deposit of salt ($NaCl$) throughout the flesh is thorough and intimate.

In consequence of the foregoing considerations, (or of other considerations, which I am unable to explain more plausibly than as above) flesh which has been preserved by my method above described seems to retain a firmer body and a more delicate texture than appears to be secured by the usual methods of packing flesh in salt or brine. At the same time experience also seems to indicate a nearer approximation, in the flesh preserved by my method, to the original flavor of the flesh in fresh condition, than is secured by its preservation by means of salt or a saline solution. This result I am inclined to ascribe to the facts (as I believe them) that a solution of sodium hypochlorite not only is less of a solvent, than is a saline solution, of the semi-fluid food elements contained in the cells or tissues, but also, when used in conjunction with salt as a preservative, the presence of sodium hypochlorite further renders such elements less soluble by such salt or solutions in which such salt is present.

An accompanying effect which is of an advantageous nature to the packer, and which may be regarded as a consequence of the conservation of food elements just noted, is found in a smaller loss of weight in the final product of preserved flesh as compared with flesh preserved by the usual methods of salting; this advantage in my opinion resulting from the smaller loss of food constituents by reason of their decreased solubility in saline solutions after being first subjected to the action of, or in the presence of, sodium hypochlorite.

In many cases where bacterial growths have begun to make their appearance upon flesh imperfectly or insufficiently preserved by salting or other processes, a supplementary treatment of the same by immersion in a solution of sodium hypochlorite will be found to remove such growths and arrest their future progress; and, provided the immersion in the hypochlorite solution is sufficiently long continued to permit the thorough permeation of the hypochlorite salt throughout the flesh in the manner hereinbefore noted, the flesh will be preserved from further deterioration.

I claim as my invention:

1. The method of preserving flesh or organic matter which consists in treating the same with sodium hypochlorite (NaClO).

2. The method of preserving flesh or organic matter which consists in immersing the same in a solution of sodium hypochlorite (NaClO).

3. The method of preserving flesh or organic matter which consists in treating the same with sodium hypochlorite (NaClO) and with common salt.

4. The method of preserving flesh or organic matter which consists in packing the same with common salt and a solution of sodium hypochlorite (NaClO).

5. The method of preserving flesh or organic matter which consists in packing the same with common salt in the presence of a solution of sodium hypochlorite (NaClO).

In testimony whereof I affix my signature in presence of two witnesses.

GEORGE D. ROGERS.

Witnesses:
 LAURA McC. QUINN,
 CHARLES T. SMITH.